(12) United States Patent
Meier

(10) Patent No.: US 7,539,770 B2
(45) Date of Patent: *May 26, 2009

(54) DHCP OVER MOBILE IP

(75) Inventor: Robert C. Meier, Cuyahoga Falls, OH (US)

(73) Assignee: Cisco Technology, Inc.

( * ) Notice: Subject to any disclaimer, the term of this patent is extended or adjusted under 35 U.S.C. 154(b) by 465 days.

This patent is subject to a terminal disclaimer.

(21) Appl. No.: 11/466,286

(22) Filed: Aug. 22, 2006

(65) Prior Publication Data

US 2006/0280179 A1 Dec. 14, 2006

Related U.S. Application Data

(63) Continuation of application No. 10/035,954, filed on Dec. 26, 2001, now Pat. No. 7,096,273.

(60) Provisional application No. 60/286,425, filed on Apr. 25, 2001.

(51) Int. Cl.
*G06F 15/16* (2006.01)

(52) U.S. Cl. .................. 709/236; 709/222; 709/230

(58) Field of Classification Search .................. 709/220, 709/222, 230, 236
See application file for complete search history.

(56) References Cited

U.S. PATENT DOCUMENTS 6,856,624 B2 * 2/2005 Magret ....................... 370/392

* cited by examiner

*Primary Examiner*—John Follansbee
*Assistant Examiner*—Nghi V Tran
(74) *Attorney, Agent, or Firm*—Tucker Ellis & West LLP

(57) ABSTRACT

A protocol that enables an 802 mobile host to obtain a "home IP address," and other configuration parameters via DHCP or BOOTP, while attached to either its home subnet or a foreign subnet. Inner and outer encapsulation headers are used to forward DHCP messages from a DHCP server outbound through a "forward tunnel," to a mobile host on a foreign subnet and are also used to forward DHCP messages from a mobile host on a foreign subnet inbound through a "reverse tunnel" to the home subnet. A mobile host adds an inner encapsulation header to inbound DHCP packets with the source IP address set to 0 to indicate that the packet is from a mobile host that does not have a registered home IP address. Outer encapsulation headers contain the home address and the care-of address for the mobile host.

13 Claims, 5 Drawing Sheets

DHCP OVER MOBILE IP

CROSS-REFERENCE TO RELATED APPLICATIONS

This application is a continuation of U.S. patent application Ser. No. 10/035,954, now U.S. Pat. No. 7,096,273 filed Dec. 26, 2001 which claims the benefit of U.S. Provisional Application No. 60/286,425 filed Apr. 25, 2001, incorporated herein by reference.

BACKGROUND OF THE INVENTION

The Internet Protocol ("IP" or "TCP/IP") has become the de facto standard for most network communication. The earliest networks required all the devices be connected to each other by wired connections, and the device needed an IP address that uniquely identified the device's point of attachment to the Internet. The device was required to be located on the network indicated by its IP address in order to receive datagrams destined to it; otherwise, datagrams destined to the device would be undeliverable. For a device to change its point of attachment without losing its ability to communicate, the device either had to change its IP address whenever it changed its point of attachment, or host-specific routes had to be propagated throughout much of the Internet routing fabric. Furthermore, because IP unlike other networking protocols such as IPX, need addresses and configuration settings to be defined on each device on the network, there may be an immense amount of system administration work.

The Dynamic Host Configuration Protocol ("DHCP") was developed to ease the amount of work and administration required to manage IP networks. DHCP allowed "pools" of TCP/IP addresses to be assigned to a DHCP server which are then allocated to client devices by the DHCP server. The pools are called scopes in DHCP terminology. Furthermore, DHCP not only assigned TCP/IP addresses, but also enabled required configuration settings such as subnet, mask, default router, and DNS server which are required for TCP/IP to work properly to be set. DHCP works across most routers and allocates IP addresses according to the subnet where the request initiated, eliminating the need to re-configure a device that moved from one subnet to another. Another feature of DHCP is that addresses can be leased for periods of time. When the address expires, the device may either request a renewal, otherwise, the IP address is put back into the pool of unallocated addresses which helps to recover unused IP addresses.

The procedure for using DHCP is quite simple. When a DHCP client is first switched on, it sends a broadcast packet on the network with a DHCP request. This is picked up by a DHCP server, which allocates an IP address to the device from one of the scopes (the pools of addresses) it has available.

Each DHCP scope is used for a different TCP/IP network segment. On net-works with routers that support DHCP, extra information is added to the request by the router to tell the server which network the request came from. The DHCP server uses this information to pick an address from the correct scope. The server replies to the client, allocating it the TCP/IP address and settings required.

However, DHCP doesn't allocate the address permanently. It tells the client that it has "leased" the address to it for a specific time period, which the administrator can control. By default DHCP is installed with a three-day lease period. When the lease expires, the client can ask the server to renew the lease. If the DHCP server doesn't hear from the client beyond the expiration of the lease period, it will put that address back in the pool ready to be re-used.

Recently, mobile, usually wireless, devices have gained popularity. It is desired that these devices also use the IP protocol. Because mobile devices change locations, the device may be located on either its home or a foreign network. Presently, each mobile device is always identified by its home address, regardless of its current point of attachment to the Internet. A standard protocol, Mobile IP, is used to forward IP packets between a mobile host on a foreign network and the home network for the mobile host. While situated away from its home network, a mobile device is associated with a care-of address, which provides information about its current point of attachment to the Internet.

A mobile host that boots on its home subnet can use DHCP to obtain a home IP address on its home subnet. By default, a DHCP server will allocate an IP address for the subnet where a DHCP request originates. Therefore, a mobile host that boots on a foreign subnet cannot simply broadcast a DHCP request on the local subnet to obtain an IP address for its home subnet. Standard Mobile IP requires that a mobile host must have a permanent IP address for its home subnet. Therefore, a mobile host, without an IP address, cannot use Mobile IP to forward a DHCP request to a DHCP server on its home subnet because it does not have a home IP address. Therefore, a mobile device cannot use DHCP when booting on a foreign network.

In one proposed solution, a mobile host can send a Mobile IP Registration Request, with a "home address" of zero to a "home agent" on its home subnet, obtain a "temporary home IP address" from the home agent and then send inbound requests to the home DHCP server, therefore the home DHCP server services the request. The solution assumes that the corresponding DHCP Reply will be sent to a broadcast MAC address (i.e. Ethernet address). However, the DHCP standard recommends that a DHCP reply be sent to a unicast MAC address. A Mobile IP home agent in a router can only receive frames with the unicast destination 802 address of the router interface. Therefore, a DHCP Reply with a unicast 802 destination address cannot be forwarded to the mobile host by the home agent.

A proposed solution for the previous problem has been to enter the temporary IP address assigned to the mobile host into the giaddr field of a DHCP request. However, this proposal is in conflict with current DHCP/BOOTP forwarding rules. BOOTP rules require that when a BOOTP relay agent receives a request, if the giaddr field is zero, the BOOTP relay agent inserts its address and then forwards the request; however, if the giaddr field is nonzero, the Bootstrap Protocol (BOOTP) relay agent cannot forward the request. Therefore, this proposed solution will not work because the BOOTP relay agent cannot forward a BOOTP or DHCP request with a nonzero giaddr field.

Additional objects, advantages and novel features of the invention will be set forth in part in the description which follows, and in part will become apparent to those skilled in the art upon examination of the following or may be learned by practice of the invention.

OVERVIEW OF THE EXAMPLE EMBODIMENTS

In an example embodiment, disclosed herein, there is described an apparatus comprising a Dynamic Host Configuration Protocol (DHCP) client in an Internet Protocol (IP) host and a mobile host communicatively coupled to the DHCP client. The DHCP client is responsive to submit a DHCP request from a foreign agent by generating a DHCP request comprising a protocol field, a source IP address and a gateway IP address (giaddr), wherein the protocol field is set to the Media Access Control (MAC) address of the Mobile Host, the source IP address is set to a predefined value indicative that a source IP address has not been assigned and the gateway IP address is set to a predefined value indicative that a gateway IP address has not been assigned. The mobile host is configured to be responsive to receiving the DHCP request with the protocol field is set to the Media Access Control (MAC) address of the Mobile Host, the source IP address is set to a predefined value indicative that a source IP address has not been assigned and the gateway IP address is set to a predefined value indicative that a gateway IP address has not been assigned to add an IP in IP encapsulation header with a source address and a destination address to the DHCP request. The mobile host sets the destination address of the IP in IP encapsulation header to an unicast address of the foreign agent, and the mobile host sets the source address of the IP in IP encapsulation header to a predetermined address indicative that the source address is undefined.

In an example embodiment described herein, there is disclosed an apparatus comprising a home agent and a Bootstrap Protocol (BOOTP) relay agent communicatively coupled to the home agent. The home agent is responsive to receiving a dynamic host control protocol (DHCP) request comprising a protocol field, a source IP address and a gateway IP address (giaddr) encapsulated with an inner IP in IP encapsulation header and an outer IP in IP encapsulation header to remove the outer IP in IP encapsulation header from the request. The home agent is configured to examine a source IP address in the inner IP in IP encapsulation header. The home agent is responsive to the source IP address not being an unassigned IP address to discard the DHCP request responsive. The home agent is responsive to the source IP address being an unassigned IP address to obtain a media access control (MAC) address of a mobile host associated with the DHCP request from the protocol field and forwards the DHCP request to the BOOTP relay agent.

In an example embodiment described herein, there is disclosed a system comprising means for sending a mobile registration request having a MAC address as a mobile host identifier, means for generating a DHCP request by a DHCP client, the DHCP request having a protocol field, a source IP address field and a gateway IP address (giaddr) field, wherein the protocol field being set to the MAC address of the mobile host, the source IP address field is set to 0, and the giaddr field is set to 0, means for adding a first inner IP encapsulation header to the DHCP request, means for adding a first outer IP encapsulation header to the DHCP request, means for sending the DHCP request to a home subnet, means for removing the first inner IP encapsulation header and first outer IP encapsulation header from the DHCP request, means for forwarding the request to a DHCP server, means for generating a reply to the DHCP request, means for adding a second inner IP encapsulation and a second outer IP encapsulation header to the reply, means for sending the reply to a foreign subnet, means for removing the second outer encapsulation header and the second inner encapsulation header from the reply; and means for forwarding the reply to the DHCP client. The DHCP server is on the home subnet and the DHCP client obtains an IP address from the reply sent by the DHCP server.

Among those benefits and improvements that have been disclosed, other objects and advantages of this invention will become apparent from the following description taken in conjunction with the accompanying drawings. The drawings constitute a part of this specification and include example embodiments of the present invention and illustrate various objects and features thereof.

DESCRIPTION OF EXAMPLE EMBODIMENTS

Figure 1:
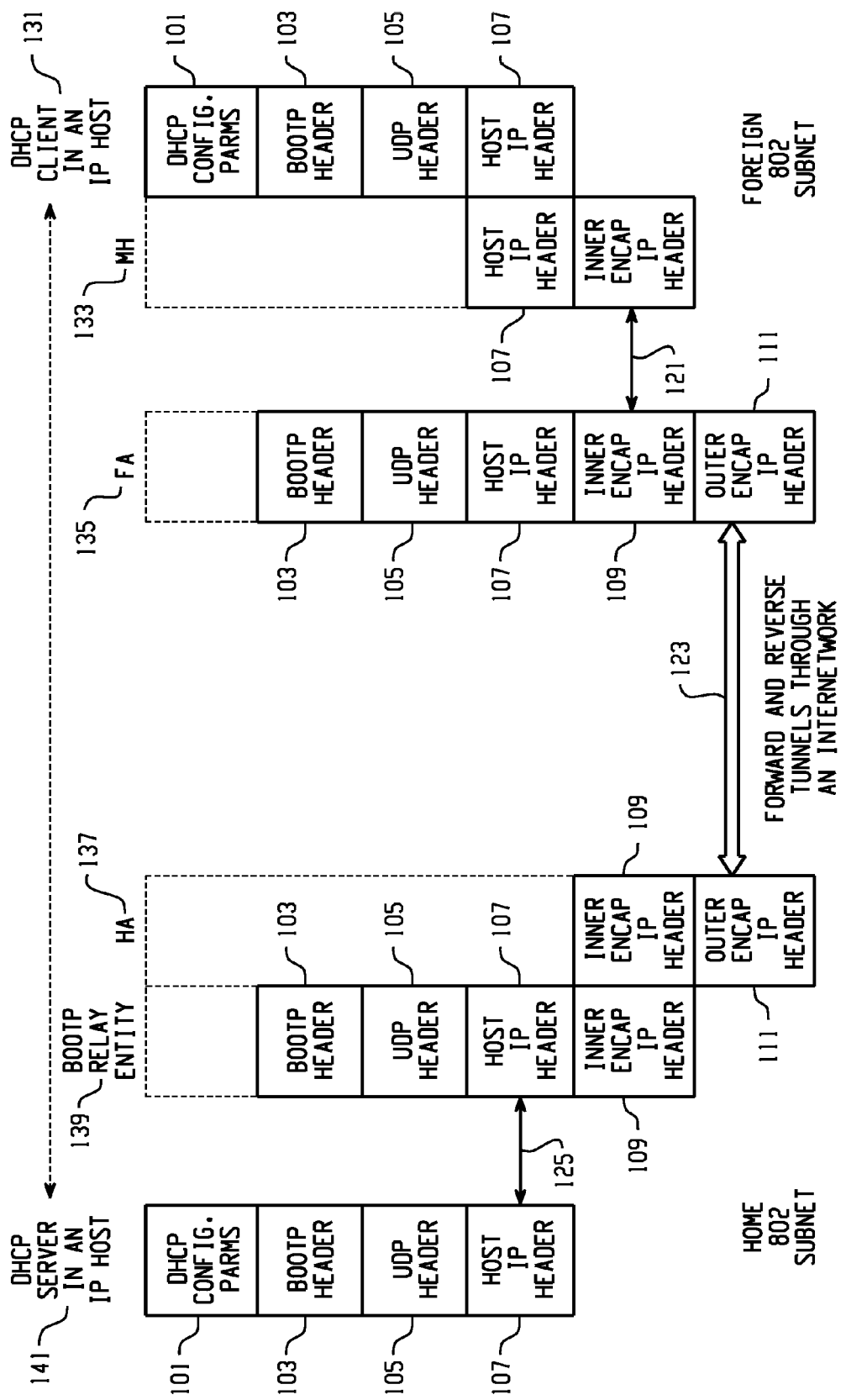
FIG. 1 illustrates an example of encapsulation headers being added and removed at each entity on the path between a DHCP client and a DHCP server.

A description of an example embodiment illustrating the best mode is described herein. In the drawings, like reference numbers refer to like components.

Referring now in particular to FIG. 1, there is shown an example of how encapsulation headers are added and removed at each entity on the path between a DHCP client 131 and a DHCP server 141 when the client makes a request from a foreign network. A more detailed description is provided in FIG. 2. FIG. 1 assumes that the mobile host is connecting to a foreign subnet and the DHCP server 141 and BootP relay entity 139 reside on a home 802 subnet. Portions of the packet that are not used by an entity are shown in dashed lines. For example the mobile host may use proxy mobile host software which only uses the DHCP request Host IP header 107 in generating the encapsulated IP packet while the foreign agent will look at the BOOTP header 103 to obtain the mobile host's 802 address.

The DHCP client in an IP host 131 within the mobile host 133 generates the DHCP request. The packet for the request includes the DHCP Configuration parameters 101, the BOOTP header 103, the UDP header 105 and the Host IP header 107. Mobile host 133 may employ software that can be integrated with the DHCP client's 131 IP stack or proxy software may exist as an independent entity. The mobile host 133 host then adds an IP-in-IP encapsulation header 109. The FA 135 address is the destination address and the source IP address is 0 in the IP-in-IP encapsulation header 109.

The packet from the mobile host is then sent to the foreign agent 135 across path 121. The foreign agent 135 then adds an outer encapsulated IP header 111 to the packet and then forwards the packet to the home address 137 across path 123. The HA 137 upon receiving the encapsulated DHCP request through the reverse IP tunnel then removed the Outer Encapsulated IP header 111. The packet is then forwarded by the HA 137 to a BootP relay entity 139 connected to the HA 137. The BOOTP relay entity 139 then removes the Inner encapsulated IP header 109 and then forwards the DHCP request via path 125 to the DHCP Server 141.

The DHCP server 141 then sends the reply to the BootP relay entity 139 over path 125. When the BootP relay entity 139 receives the reply, it adds an inner encapsulated IP header with the source address set equal to the home agent address and the destination address set to zero. The BootP relay entity 139 then forwards the reply to the home agent which then adds an outer IP-in-IP encapsulation header 111 with the source address set to the home agent and the destination address set to the foreign agent care-of address. The packet is then forwarded to the foreign agent 135 across path 123. The foreign agent 135 then removes the outer encapsulated IP header 111 and forwards the packet to the mobile host 133. The mobile host 133 upon receiving the packet removes the inner encapsulated IP header 109 and forwards the packet to the DHCP client 131.

Figure 2A:
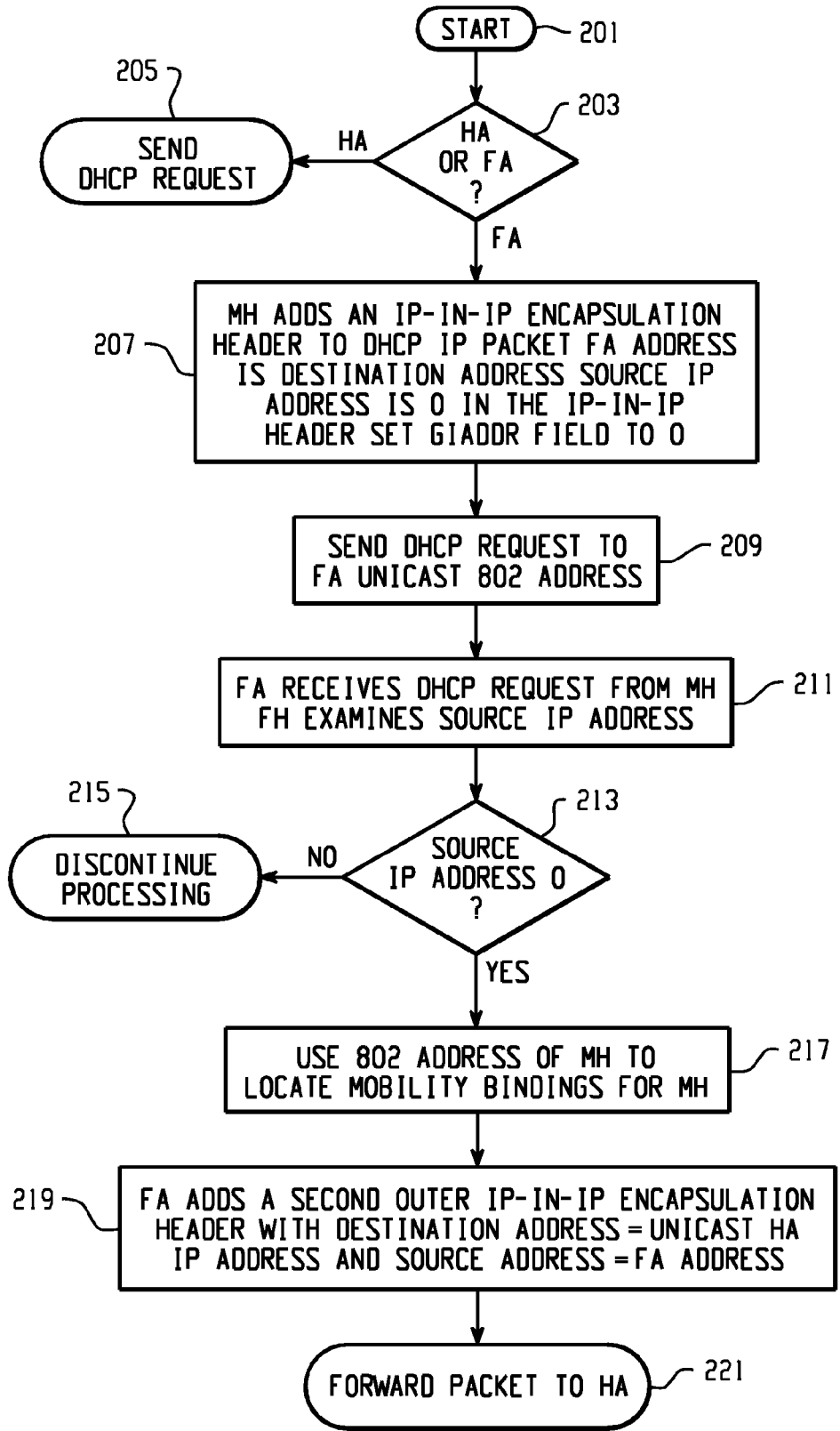
FIG. 2A illustrates an example of steps involved in the initiating of a DHCP request and its subsequent receipt by a foreign agent and subsequent forwarding to the mobile hosts home agent.

Referring now to FIG. 2A, the process starts at step 201 when a DHCP client 131 generates a DHCP request packet. At step 203 the mobile host determines whether the mobile host is on a home network or a foreign subnet. If at step 203 it is determined that the mobile unit is on its home subnet, then processing branches to the normal DHCP routine at step 205. If the mobile host determines it is connected to a foreign agent, the mobile host adds an IP-in-IP encapsulation header 109 to the DHCP IP packet at step 207. The mobile host 133 then sets the destination address of the IP-in-IP encapsulation header 109 to the FA's 135 address and the source IP address is set to 0. The packet's giaddr field is also set to zero. At step 209 the MH 133 sends the packet to the FA 135 using the FA's 135 unicast 802 address.

The FA 135 receives the packet in step 211. At step 213 the FA 135 examines the source IP address. If the source IP address is zero then the foreign associate aborts the DHCP process as shown in step 215. The foreign agent 135 determines mobility bindings for the mobile host 133 using IP. If the source IP address is zero, then the FA uses the 802 address of the mobile host to locate mobility bindings for the mobile host 133 as shown in step 217.

At step 219 the FA adds a second, outer IP-in-IP encapsulation header 111 with the destination address set to the unicast HA IP address and the source address set to the FA IP address. The packet is then forwarded to the HA as shown in step 221.

Figure 2B:
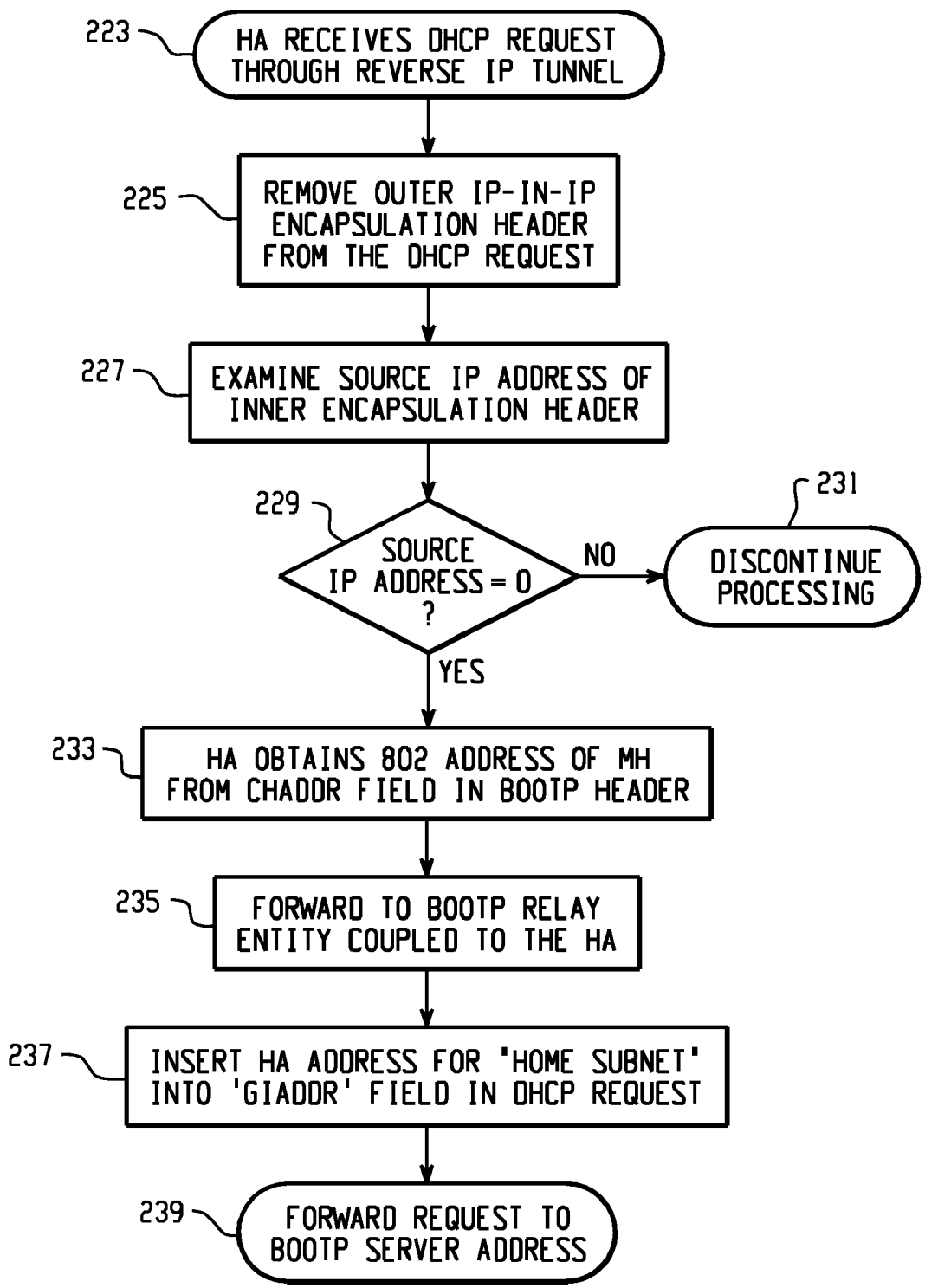
FIG. 2B illustrates an example of steps utilized by the home agent upon receipt of the DHCP request from the foreign agent.
Figure 2C:
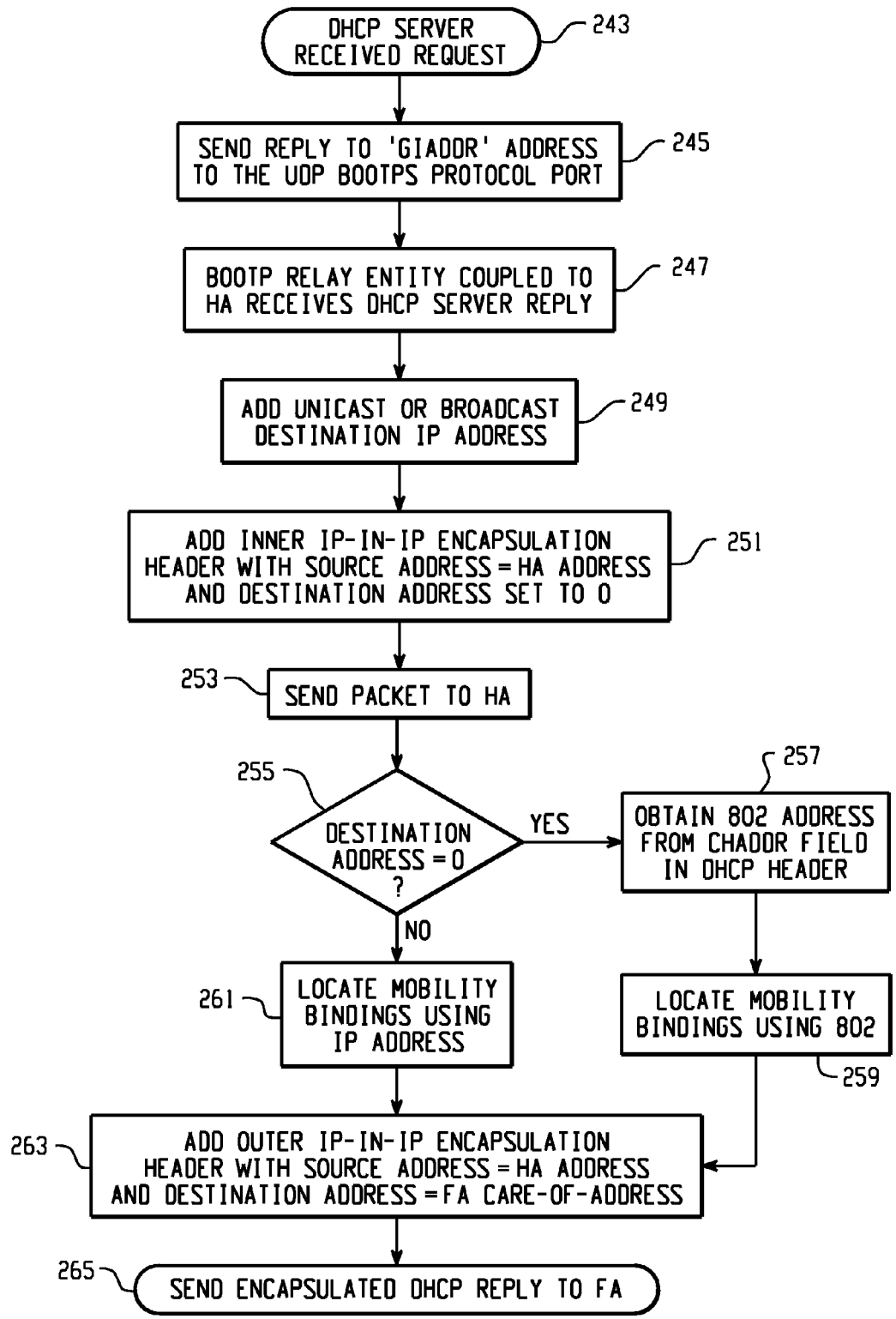
FIG. 2C is illustrates an example of steps utilized by a DHCP server upon receipt of the DHCP request, and subsequent forwarding of the reply to the home agent; and, FIG. 2D illustrates an example of steps from when the foreign agent receives the DHCP until it is finally received and processed by the mobile host.

As shown in FIG. 2B, the HA 137 receives the DHCP request through reverse IP tunnel as shown in block 223. The HA then removes the outer IP-in-IP encapsulation header from the DHCP request as shown in step 225. Then in step 227 the HA examines the IP address of the inner encapsulation header 109. If at step 229 it is determined that the Source IP address of the inner encapsulation header 109 is not zero, then at step 231 the process aborts. Otherwise, if the source IP address of the inner encapsulation header 109 is zero at step 229, the BOOTP relay entity 139 then obtains the 802 address of the mobile host from the chaddr field in the BOOTP header 103 as shown in step 233

At step 235, the HA forwards the request to a BOOTP relay entity 139 coupled to the HA 137. At step 237, the BOOTP relay entity 139 then inserts the HA address for the home subnet into the giaddr field of the DHCP/BOOTP header 103 and then, at step 237, forwards the request to the DHCP/BOOTP server 141 address Referring now to FIG. 2C, at step 243 the DHCP server 141 receives the request. The DHCP sends the reply to the giaddr address in the UDP BOOTPS protcol port 105 at step 245. At step 247, the BOOTP relay entity coupled to the HA receives the DHCP server reply. The BOOTP relay entity 139 then adds the unicast or broadcast destination IP address to the IP header of the reply at step 249. In step 251 the BOOTP relay entity 139 then adds an inner IP-in-IP encapsulation header 109 to the reply, setting the source address to the HA 137 and the destination address is set to 0. A step 253 the BOOTP relay entity 139 sends the reply to the HA 137.

As shown in step 255 the HA 137 examines the destination address of the inner IP-in-IP encapsulation header 109. If the destination header is zero then the HA obtains the 802 address from the chaddr field in the DHCP/BOOTP header 103 as shown at step 257, and then locates the mobility bindings for the mobile host 133 using the 802 standard as shown in step 259. If the destination address of the inner IP-in-IP encapsulation header 109 is nonzero then the mobility bindings are located using the IP address as shown in step 261. The HA 137 then adds an outer IP-in-IP encapsulation header 111 with the source address set to the HA's address and the destination set to the FA care-of-address as shown in step 263. At step 265 the HA then sends the encapsulated DHCP reply to the FA 135.

Figure 2D:
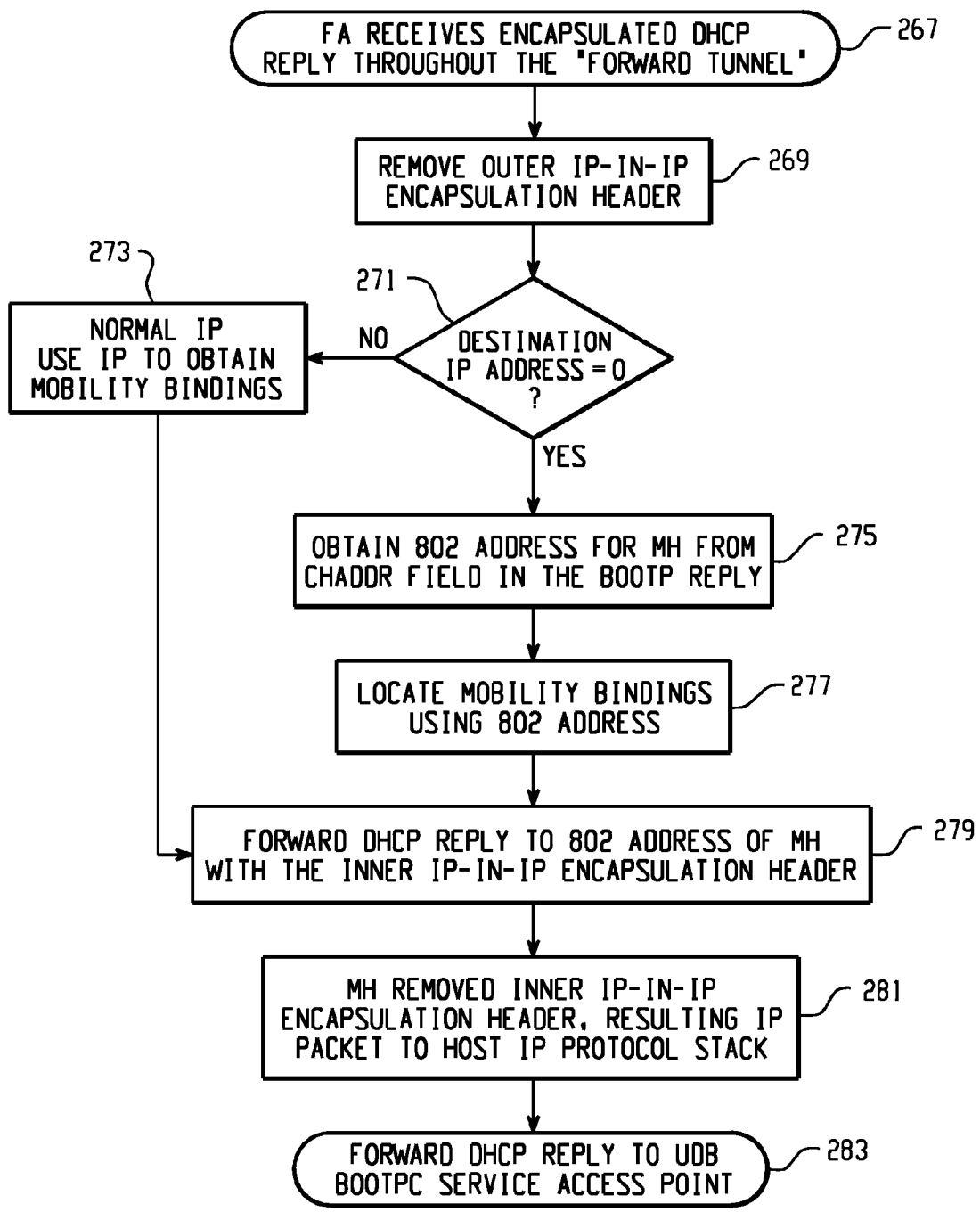

Referring now to FIG. 2D, the FA 135 receives the encapsulated DHCP reply through the forward IP tunnel at step 267. The FA 135 then removes the outer IP-in-IP encapsulation header 111 from the reply as shown in step 269. At step 271 the FA 135 examines the IP destination address of the Inner IP-in-IP encapsulation header 109 to determine where to find the mobility bindings for the mobile host 133. If at step 271 the Destination IP Address is nonzero, then processing proceeds to step 273 where normal IP is used to obtain mobility bindings. If the destination IP address is zero at step 271, then the FA 135 must obtain the 802 address for the MH 133 from the chaddr field in the BOOTP reply message as shown in step 275. At step 277 the FA 135 locates the mobility bindings using the 802 address. After obtaining the mobility bindings, the FA 135 forwards the DHCP reply to the 802 address of the MH 133 with the inner IP-in-IP encapsulation header 109 as shown in step 279.

At step 281, the MH 133 then removes the inner IP-in-IP encapsulation header 109 and the resulting IP packet is sent to the host IP protocol stack. At step 283, the DHCP reply is then forwarded to the UDP BOOTPC "service access point" (not shown) of the DHCP client in an IP host 131.

The tunneling logic for a MH 133 with a co-located care-of address is similar, except that the inner encapsulation header 109 is optional for outbound packets. Inbound packets must have an inner 109 and outer 111 encapsulation header with a FA 135 care-of address.

The present invention contemplates that the HA and FA use the 802 address of a MH to associate DHCP messages with the mobility bindings for a MH without a registered home IP address. The 802 address is obtained from the source 802 address in frames sent from the MH to a FA. Otherwise, the 802 address is obtained from the 'chaddr' field in DHCP request or reply.

A MH can optionally include the Network Access Identifier ("NAI") extension in Mobile IP Registration requests. Either the NAI or the MH's 802 address can be used to locate administration and authentication information for the MH.

A Mobile Host Identifier ("MHID") extension is used to flexibly extend the identifier naming space for Mobile IP Mobile Hosts. It is defined consistently with the Endpoint Discriminator option for Multilink PPP (RFC 1990).

A MHID contains a 'Class' field and an 'Address' field.

The Address field contains a unique identifier for a Mobile Host (MH). The identifier should be globally unique. The identifier must be unique within the context of a Mobile IP "domain". The identifier size is determined from the extension Length field. The identifier size may be fixed or variable, depending on the identifier class. A MHID extension is invalid if the Length field indicates a size below the minimum for the class.

The Class field is one octet and indicates the identifier address space. Valid values for the Mobile IP MHID Extension are listed below:

0 Null Class
1 2-bit Internet Protocol version 4 (Ipv4) Address
3 48-bit IEEE 802 Globally Assigned MAC Address
5 Public Switched Network Directory Number
10 Network Access Identifier (NAI)

The MHID extension provides a flexible mechanism for establishing one or more MH identifiers. A MHID may be used for various purposes. For example, an "NAI" identifier may be used to locate administration or authentication records in a database. A "MAC address" identifier may be used to dynamically associate a MH IP address with a MAC address. A MHID may also be used to locate mobility bindings for a MH that does not have a "home IP address".

A MH may include 0 or more MHID extensions in Mobile IP Registration Requests. MHID extensions must appear in a Registration Request before both the Mobile-Home Authentication extension and Mobile-Foreign Authentication extension, if present.

A Mobile IP home or foreign agent must return a MHID extension in a Mobile IP Registration response to acknowledge support for the MHID class. A HA must enter a MHID extension in a Registration Response before the Mobile-Home Authentication extension. A HA must enter a MHID extension in a Registration Response before the Mobile-Foreign Authentication extension, if present.

A MH without a home IP address may set the "home address" field to 0 in a Registration request that contains a MHID extension with an 802 address. A MH that sends such a request must continue to include the 802 address MHID extension in any successive Registration requests (i.e. even if it obtains a home IP address). A HA or FA that accepts a Registration request with an 802 address MHID extension must establish the MH 802

The present invention requires that a MH must send Registration requests with a new Mobile Host Identifier extension that contains the IEEE 802 address of the MH, to establish mobility bindings. A HA or FA that receives a MHID, in a Registration request, with the 802 address of a MH, must create or update mobility bindings for the MH that are indexed by the 802 address. Both the HA and FA must enter a MHID extension in a Registration response, with the 802 address of the MH, to acknowledge that it has created such bindings. MHID extensions are protected by Authentication extensions.

A MH without a home IP address must send Registration requests with the "home address" field set to 0 in a request that contains a MHID extension with an 802 address. A MH that sends such a request must continue to include the 802 address MHID extension in any successive Registration requests, even if it obtains a home IP address. A HA or FA that accepts a Registration request with an 802 address MHID extension must establish the MH 802 address as an index into MH mobility bindings. A HA or FA that accepts a Registration request with both a non-zero home IP address in the "home address" field and an 802 address MHID extension must establish both the MH 802 address and the MH home address as an index into MH mobility bindings.

A FA may include an ICMP MHID extension in FA advertisements to advertise general support for the MHID extension. The Class field should be set to Null or 0.

A DHCP server may assign an IP address with a temporary "lease"; therefore, a MH may lose its home IP address. A MH that has dynamically acquired a "temporary" home IP address, via BOOTP or DHCP, must continue to send Registration requests that include a MHID extension, with its 802 address. The Registration request should also include a MHID extension with the temporary home IP address of the MH. The IP address MHID indicates that the MH is using a temporary address. A HA or FA that receives a Registration request with an 802 address MHID extension and a non-zero "home address" field must maintain mobility bindings that are indexed by both the 802 address and the home IP address.

A MH, on a foreign subnet, must generate a new Registration request whenever it initially acquires a home IP address or whenever its home IP address changes. Any new IP address must be entered into the "home address" field in the request header. The "old" IP address must be entered in a MHID extension in the Registration request until the MH receives a matching Registration response. A HA and FA must examine both the "home address" field and the MHID address. If the "home address" is different than the MHID IP address, then it is assumed that the MHID IP address is "old". The HA and FA must immediately delete its mobility bindings for the old address.

A "promiscuous HA" can receive frames, that originate on the home subnet, with any unicast 802 destination address. A "non-promiscuous HA" can only receive unicast frames with the 802 destination address for the HA home subnet interface. It is assumed that a HA is "non-promiscuous".

A DHCP server may transmit "broadcast DHCP reply messages", with broadcast destination IP and 802 addresses, or "unicast DHCP reply messages" with unicast destination IP and 802 addresses. A unicast destination IP address in a DHCP reply message, for a MH, may not be a "registered" home IP address. A non-promiscuous HA cannot receive such unicast DHCP reply messages. To solve the problem, a "BOOTP relay" software entity is coupled with the Mobile IP software in a non-promiscuous HA. The BOOTP relay entity functions much like a standard BOOTP Relay agent, as defined in the Bootstrap Protocol and RFC 1542. The BOOTP relay entity sets the 'giaddr' field, in DHCP request messages from MHs, to the HA IP address for the home subnet, so that DCHP reply messages are sent to the unicast IP address and unicast 802 address of the HA.

In a promiscuous HA, a "BOOTP reply filter" can replace a BOOTP relay entity. The BOOTP reply filter functions much like a BOOTP relay entity in a non-promiscuous HA, with one notable exception. A BOOTP reply filter does not modify the 'giaddr' field in DHCP requests. Instead, the BOOTP reply filter must promiscuously receive DHCP replies that are destined for MHs on foreign subnets.

The "BOOTP relay entity" coupled to the HA should generate several proxy test ARP request packets when it receives a DHCPOFFER message from a DHCP server. The target IP address in the test ARP request packets is set to the "offered" IP address. If the BOOTP relay entity receives an ARP response packet, then it should not forward the DHCPOFFER message to the MH. Note that the address may already be in use or the MH may have roamed back to its home subnet.

The maximum transmission unit (MTU) size may be exceeded when an encapsulation header is added to a packet. Therefore, packets may be fragmented and reassembled. The fragmentation and reassembly logic for home and foreign agents is unaffected by the present invention.

The source IP address in the inner and outer encapsulation headers in outbound packets sent from the HA to the MH care-of address both contain the HA IP address; therefore, the BOOTP relay entity and the HA must share a "global" counter that is used for the IDENTIFICATION value in the IP headers.

The BOOTP relay entity coupled to the HA will receive encapsulated packets from multiple MHs all with a source IP address of 0. Therefore, the BOOTP relay entity must maintain reassembly queues that are indexed by the MH 802 address.

The present invention does not require any changes to the BOOTP/DHCP standards. However, an implementation of the present invention should observe the following rules: (1) a DHCP server should not consider it an error if a DHCP receives a request on its physical subnet and the 'giaddr' address is on the same physical subnet; and (2) a BOOTP relay agent should forward a DHCP request independently of the value in the 'giaddr' field (BOOTP standards prohibits a BOOTP relay agent from modifying a non-zero 'giaddr' value).

Although the invention has been shown and described with respect to a certain preferred embodiment, it is obvious that equivalent alterations and modifications will occur to others skilled in the art upon the reading and understanding of this specification. The present invention includes all such equivalent alterations and modifications and is limited only by the scope of the following claims.

What is claimed is:

1. An apparatus comprising:
a Dynamic Host Configuration Protocol (DHCP) client in an Internet Protocol (IP) host; and
a mobile host communicatively coupled to the DHCP client;
wherein the DHCP client is responsive to submit a DHCP request from a foreign agent by generating a DHCP request comprising a protocol field, a source IP address and a gateway IP address (giaddr), wherein the protocol field is set to the Media Access Control (MAC) address of the Mobile Host, the source IP address is set to a predefined value indicative that a source IP address has not been assigned and the gateway IP address is set to a predefined value indicative that a gateway IP address has not been assigned;
wherein the mobile host is configured to be responsive to receiving the DHCP request with the protocol field is set to the Media Access Control (MAC) address of the Mobile Host, the source IP address is set to predefined value indicative that a source IP address has not been assigned and the gateway IP address is set to a predefined value indicative that a gateway IP address has not been assigned to add an IP in IP encapsulation header with a source address and a destination address to the DHCP request;
wherein the predefined value indicative that a source IP address has not been assigned is zero, the predefined value indicative that a gateway IP address has not been assigned is zero, and the predetermined address indicative that the source address is undefined is zero;
wherein the mobile host sets the destination address of the IP in IP encapsulation header to an unicast address of the foreign agent; and
wherein the mobile host sets the source address of the IP in IP encapsulation header to a predetermined address indicative that the source address is undefined.

2. An apparatus according to claim 1, further comprising:
a foreign agent communicatively coupled to the mobile host;
wherein the foreign agent is responsive to receiving the DHCP request from the mobile host to determine the source IP address in the IP in IP encapsulation header;
wherein the foreign agent is responsive to discard the DHCP request responsive to determining the source IP address of the IP in IP encapsulation header is a value indicative of an assigned IP address; and
wherein the foreign agent is responsive to use the MAC address to locate mobility bindings for the mobile host responsive to determining the source IP address of the IP in IP encapsulation is a value is undefined.

3. An apparatus according to claim 2, wherein the foreign agent is responsive to determining the source IP address of the IP in IP encapsulation is a value is undefined to add a second IP in IP encapsulation header to the DHCP request.

4. An apparatus according to claim 3, wherein the second IP in IP encapsulation header comprises a source address and a destination address;
wherein the foreign agent is responsive to set the source address of the second IP in IP encapsulation header to an address for the foreign agent; and
wherein the foreign agent is responsive to set the destination address of the second IP in IP encapsulation header to an address for a home agent.

5. A apparatus comprising:
a mobile host communicatively coupled to the DHCP client in an Internet Protocol (IP) host;
a home agent;
a Bootstrap Protocol (BOOTP) relay agent communicatively coupled to the home agent;
wherein the BOOTP relay agent is responsive to receiving the DHCP request to insert a home agent address for a home subnet into the gateway IP address (giaddr) of the DHCP request;
wherein the BOOTP relay agent is configured to forward the DHCP request to a DHCP server communicatively coupled to the BOOTP relay agent;
wherein the BOOTP relay agent is responsive to receiving a DHCP reply to add on of a group consisting of an unicast destination IP address and a broadcast destination IP address to the DHCP reply;
wherein the BOOTP relay agent is responsive to receiving the DHCP reply to add an inner IP in IP header to the DHCP reply;
wherein the home agent is responsive to receiving a dynamic host control protocol (DHCP) request comprising a protocol field, a source IP address and a gateway IP address (giaddr) encapsulated with an inner IP in IP encapsulation header and an outer IP in IP encapsulation header to remove the out IP in IP encapsulation header from the request;
wherein the home agent is configured to examine a source IP address in the inner IP in IP encapsulation header;
wherein the home agent is responsive to the source IP address not being an unassigned IP address to discard the DHCP request responsive;
wherein the inner IP in IP header comprises a source address and a destination address;
wherein the BOOTP relay agent is configured to insert a home agent address into the source field and setting the destination address to a value indicating the destination address has no IP address;
wherein the home agent is responsive to the source IP address being an unassigned IP address to obtain a media access control (MAC) address of a mobile host associated with the DHCP request from the protocol field and forwards the DHCP request to the BOOTP relay agent.

6. An apparatus according to claim 5, further comprising:
the BOOTP relay agent is configured to send the DHCP reply with inner IP in IP encapsulation header to the home agent; and the home agent is responsive to receiving the DHCP reply with inner IP in IP encapsulation header to add an outer IP in IP encapsulation header to the DHCP reply.

7. An apparatus according to claim 6, wherein the outer IP in IP encapsulation header of the DHCP reply comprises a source address and a destination address, the home agent is configured to insert a home agent address into the source address of the outer IP in IP encapsulation header of the DHCP reply and to insert a care of address for a foreign agent into the destination address of the outer IP in IP encapsulation header of the DHCP reply.

8. An apparatus according to claim 7, wherein the home agent is configured to forward the DHCP reply with the inner IP in IP encapsulation header and outer IP in IP encapsulation header to the foreign agent.

9. A system comprising:
- a mobile host communicatively coupled to the DHCP client in an Internet Protocol (IP) host;
- means for sending a mobile registration request having a MAC address as a mobile host identifier;
- means for generating a DHCP request by a DHCP client, the DHCP request having a protocol field, a source IP address field and a gateway IP address (giaddr) field, wherein the protocol field being set to the MAC address of the mobile host, the source IP address field is set to 0, and the giaddr field is set to 0;
- means for adding a first inner IP encapsulation header to the DHCP request;
- means for adding a first outer IP encapsulation header to the DHCP request;
- means for sending the DHCP request to a home subnet;
- means for removing the first inner IP encapsulation header a first outer IP encapsulation header from the DHCP request;
- means for forwarding the request to a DHCP server;
- means for generating a reply to the DHCP request;
- means for adding a second inner IP encapsulation and a second outer IP encapsulation header to the reply;
- wherein the second inner IP encapsulation header having a source IP address and a destination IP address, the mean for adding a second inner IP encapsulation and a second outer IP encapsulation header to the reply further comprises means for setting the second inner IP encapsulation header destination IP address to indicate that the source mobile host does not have an IP address;
- means for sending the reply to a foreigh subnet;
- means for removing the second outer encapsulation header and the second inner encapsulation header from the reply; and
- means for forwarding the reply to the DHCP client;
- wherein the DHCP server is on the home subnet and the DHCP client obtains an IP address from the reply sent by the DHCP server.

10. A system according to claim 9, wherein the first inner IP encapsulation header comprise a source address and a destination, the means for adding a first inner IP encapsulation header further comprises means for setting the first inner IP encapsulation header destination IP address to indicate that the DHCP client does not have an IP address.

11. A system according to claim 9, wherein the first outer IP encapsulation header has a source address and a destination address, the means for adding a first inner IP encapsulation header further comprises means for setting the first outer IP encapsulation header source address to the foreign agent care of address and the first outer IP encapsulation header destination address to the home agent address.

12. A system according to claim 9, wherein the DHCP request comprises a giaddr field and a chaddr field, the means for removing the first inner IP encapsulation header and first outer IP encapsulation header from the DHCP request further comprises:
- means for obtaining the MAC address of the DHCP client from the chaddr field; and
- means for inserting the BOOTP relay agent IP address into the giaddr field.

13. A system according to claim 9, the second outer IP encapsulation header having a source IP address and a destination IP address, the means for adding a second inner IP encapsulation and a second outer IP encapsulation header to the reply further comprises means for setting the second outer IP encapsulation header source address to the home agent IP address, and setting the second outer IP encapsulation header destination IP address to the foreign agent care of IP address.

* * * * *